July 2, 1935.   L. E. LA BRIE   2,006,397

BRAKE

Original Filed March 12, 1928

INVENTOR.
LUDGER E. LA BRIE
BY  J.P. Keiper
ATTORNEY

Patented July 2, 1935

2,006,397

UNITED STATES PATENT OFFICE 2,006,397

BRAKE

Ludger E. La Brie, South Bend, Ind., assignor to Bendix Aviation Corporation, South Bend, Ind., a corporation of Delaware Original application March 12, 1928, Serial No. 261,068. Divided and this application July 22, 1932, Serial No. 624,083

17 Claims. (Cl. 188—79.5)

This invention relates to brakes and more particularly to the adjustment thereof for wear and is illustrated as embodied in a brake of the internal expanding type.

In the usual brake of the internal expanding type the adjustment mechanism often assumes some form of telescoping members which are adapted to expand the brake shoe or brake band to take up for reduced diameter due to lining wear. This invention is directed to the improvement of such adjustment mechanism and a combination of the improved mechanism with an articulating joint for a pair of brake shoes such that relative movement between the shoes may take place as may be required due to uneven lining wear.

Accordingly, an object of the invention is to provide an improved adjustment mechanism which is rugged due to its telescoping construction and simple in construction.

Another object is the provision of an adjustment mechanism which may also function as a pivoted articulating link, and have a factor of safety closely similar to that of a fixed adjustable link.

A further object of the invention is the provision of a novel socket in the end of a shoe adapted to receive an end of the adjustment mechanism.

A still further object is the provision of novel means for preventing undesired adjustments located within the socket.

A further object of the invention is the provision of a novel guide secured to the brake support and adapted to prevent lateral movement of the shoes by acting upon the connecting link located between the adjacent shoes.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the several views.

Figure 1:
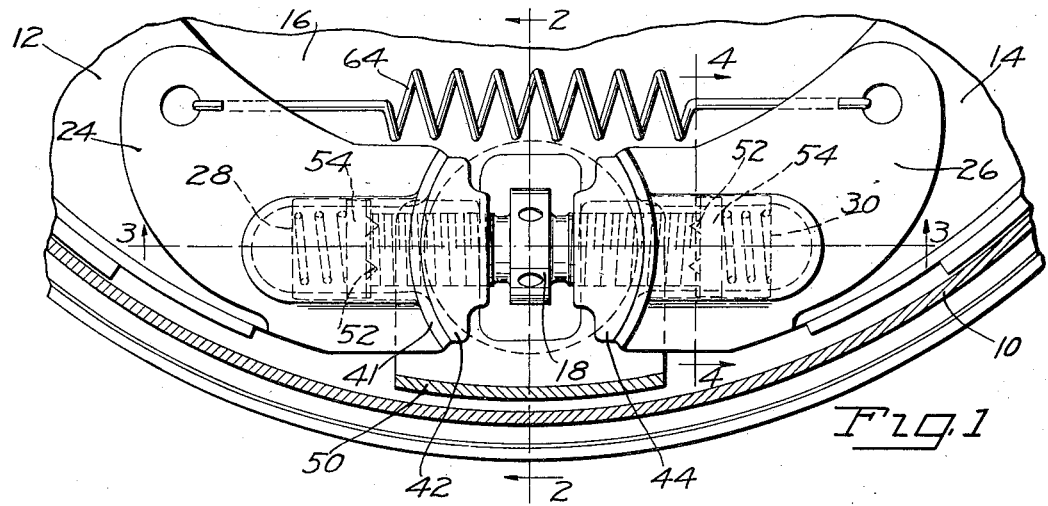
Figure 1 is a front elevation of an adjusting mechanism of a brake taken partly in section.
Figure 3:
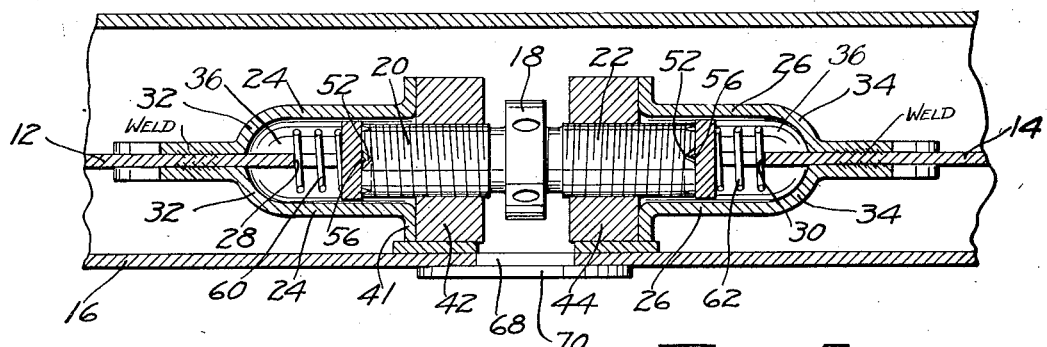
Figure 3 is a longitudinal section of adjusting mechanism of Figure 1 taken on the line 3—3.
Figure 2:
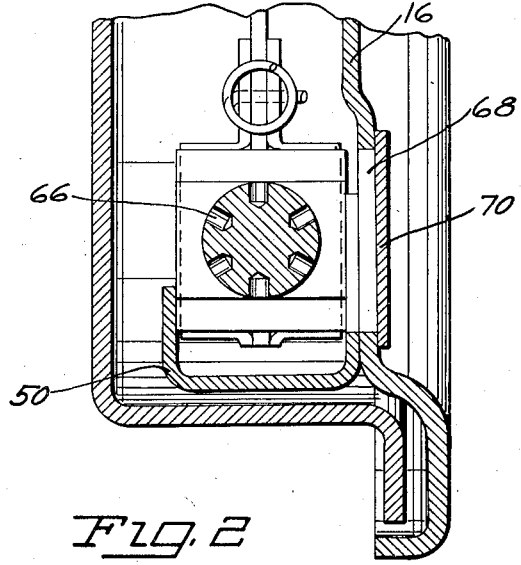
Figure 2 is a section through Figure 1 taken on the line 2—2.

Referring to Figure 1 of the drawing, there is provided the usual drum 10, brake shoes 12 and 14, and backing plate 16. The shoes 14 and 12 are adjustably connected together as shown in Figures 1 and 3, by means of the member 18 provided with right and left-hand threads 20 and 22 on the opposite ends thereof. Each of the shoes 12 and 14 may be preferably provided with plates 24 and 26 which are adapted to be secured by welding or other means to the web of the brake shoes 12 and 14. An end slot, in each of the webs of the brake shoes 12 and 14, is provided as shown at 28 and 30 which in turn is covered by the cylindrical pressed out portions 32 and 34 in the plates 24 and 26.

Figure 4:
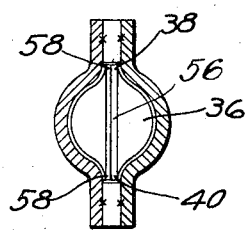
Figure 4 is a section taken on the line 4—4 of Figure 1.

As shown in Figure 4, the combination of these plates with the webs of the shoe forms a cylindrical socket 36 having key-ways 38 and 40. The plates 24 and 26 are further preferably turned up at the shoe end as shown at 41 and provided with a concave cylindrical surface adapted to receive convex cylindrical surfaced blocks 42 and 44 which threadedly engage the right and left-hand threads of the screw member 18. These blocks may be provided with a square periphery or a periphery having a pair of parallel sides which are adapted to engage a U-shaped bracket 50 which is secured to the backing plate 16 in any suitable fashion, for example welding. The U-shaped bracket 50, as may be seen, provides a guide for the blocks and permits radial movement thereof while limiting lateral movement.

Particularly for the purpose of locking the adjustment screw in any desired position the threaded ends of the member 18 may be provided with notches 52, three diametrically-extending notches being shown, which are in turn adapted to engage a disc 54 which may be provided with a projection or ridge 56 extending centrally across one face. The disc is provided with ears 58 which are adapted to ride in the slots 38 and 40 formed by the thickness of the shoe web and is urged into contact with the end of the screw threaded member 18 by springs 60 and 62 arranged between the disc and the base of the aperture in the shoe end.

As will be observed, in order to permit relative movement of the blocks with respect to the shoes on the cylindrical surfaces thereon provided, the threaded members should fit the sockets 36 with considerable clearance, thus permitting free movement into and out of the sockets as well as some angular movement. To offset the action of the springs 60 and 62, a spring 64 is provided to urge the shoes against the threaded blocks and to retain the parts in engagement with one another. A central portion of the screw 18 may be provided with suitable capstan sockets 66 or may be provided with any other preferred construction for actuation, as for example a star wheel. An aperture 68 in the backing plate permits ready access to this member and may be covered in any suitable manner by a cover plate 70.

In operation, it will be readily observed that rotation of the threaded member 18 will cause spreading action between the blocks 42 and 44, thus expanding the shoe. The threaded portion extending beyond the blocks in the shoe socket will move readily into the shoe and will be urged outwardly by reason of the springs 60 and 62. The discs 54 as will be seen, are prevented from rotation by reason of the ears 58 riding in the keyways 38 and 40 will be pressed into engagement with the end of the screw and the ridge 56 will be pressed into the grooves in the end of the threaded member to prevent normal rotation thereof.

It will be readily apparent that the pivotal motion of the blocks with respect to the shoes is advantageous in this particular construction for the reason that one shoe is likely to wear to a greater extent than the other, where, as in automotive vehicle brake installations, the brakes are utilized for forward braking a much greater amount than they are for braking in rearward direction.

Though only one embodiment of the invention has been illustrated and described, it is to be understood that the invention is not limited thereto, but may be embodied in various mechanical forms as may be found desirable. As many changes in construction and arrangement of parts may be made without departing from the spirit of the invention, as will be apparent to those skilled in the art; reference will be had to the appended claims for a definition of the limits of the invention.

This application is a division of a copending application No. 261,068 filed March 12, 1928.

What is claimed is:

1. A brake comprising, in combination, a shoe having a socket in its end, a threaded connecting device extending into the socket and a spring-pressed washer in the socket formed for locking engagement with the end of said device.

2. A brake shoe having a rigid portion provided with a thrust member at one end, and a spring acting between the shoe and said member and tending to force the member beyond the end of the shoe.

3. A brake shoe formed at its end with a socket and having a thrust member adjustably secured thereto and having a part in said socket, means in said socket urging said member for movement relative to said shoe and means for holding said member against the urging of said means.

4. The combination of a brake shoe having a socket, a separate thrust member associated with the shoe and having a part in said socket, a normally compressed spring in the socket beyond said part and acting between the member and the shoe, and means for holding said member and said shoe against the force of said spring.

5. The combination of a friction device, a thrust member at one end thereof having a part arranged to be turned to adjust said device, a normally compressed spring acting between the member and the shoe, means engaged by the spring for yieldingly holding said part against turning, and means for holding said member and said shoe against the force of said spring.

6. In a brake, the combination of a shoe, a separate thrust member engaging a surface of said shoe, a cupped retaining member formed at one end of said shoe and encompassing said thrust member, and resilient means disposed within said retaining member and acting against said thrust member.

7. A brake comprising a shoe having a cylindrical socket in its end, an adjusting member slidably mounted in said socket, and a spring in said socket urging said member outward.

8. A brake shoe having a web formed with an opening and provided with plates secured to the sides of the web and formed with registering grooves aligned with said opening and cooperating therewith to form a recess adapted to receive a connecting member, and said plates formed with oppositely extending flanges each formed with a partially cylindrical surface.

9. A brake adjustment comprising a threaded member, a partially cylindrical block threaded thereon, a shoe having a cylindrical recess adapted to receive said threaded member and a partially cylindrical end surface adapted to engage the complementary partially cylindrical surface on said block, said surfaces adapted for pivotal movement between said block and said shoe and said recess being enough larger than said member to permit said pivotal movement.

10. A brake adjustment comprising a threaded member notched on its end, a block threaded thereon, a shoe having a recess adapted to receive said threaded member, a washer keyed against rotation in said recess and adapted to engage said notched end, and a resilient means thrusting said washer into engagement with said threaded member.

11. In a brake, a backing plate, a U-shaped bracket secured along one side thereof to said backing plate, and a floating adjusting screw and a block threaded thereon adapted to engage a shoe end slidably carried in said U-shaped bracket.

12. In a brake, an adjusting screw, a block threaded thereon, and in thrust engagement with a brake shoe, a backing plate, and means thereon for guiding said block for movement parallel to said backing plate.

13. In a brake, an adjusting screw, a notched end thereon, a complementary shaped washer adapted to engage said notched end, means restraining said washer from turning, and means for urging said washer into contact with the screw.

14. A brake shoe web having a cordal slot in one end thereof, formed stampings secured to either side of said web forming a cylindrical recess substantially coaxial with said slot.

15. A brake shoe web having a slot on one end thereof, formed stampings secured to either side of said web forming a substantially cylindrical recess substantially coaxial with said slot, the margin of said slot extending beyond the cylindrical recess formed thereby providing a keyway.

16. A pair of brake shoes, a floating connecting link between two adjacent ends thereof and pivoted thereto, a support, and a bracket secured to said support restraining said connecting link from lateral movement while permitting it to move freely parallel to said support.

17. A brake comprising, in combination, a backing plate, shoes arranged end to end adjacent the plate, thrust members having partially cylindrical surfaces engaging the shoe ends, an adjusting member engaging the thrust members, and a U-shaped part secured to the backing plate and engaging the ends of the thrust members opposite the backing plate.

LUDGER E. LA BRIE.